(12) United States Patent
Whiteley et al.

(10) Patent No.: US 7,731,222 B2
(45) Date of Patent: Jun. 8, 2010

(54) ASSEMBLY FOR TOWING A WHEELED STROLLER ON SAND

(76) Inventors: Joan Whiteley, 2108 Squirrel Hill Rd., Schwenksville, PA (US) 19473-2004; Colleen Cody, 2108 Squirrel Hill Rd., Schwenksville, PA (US) 19473-2004

( * ) Notice: Subject to any disclaimer, the term of this patent is extended or adjusted under 35 U.S.C. 154(b) by 0 days.

(21) Appl. No.: 12/029,306

(22) Filed: Feb. 11, 2008

(65) Prior Publication Data

US 2009/0200762 A1 Aug. 13, 2009

(51) Int. Cl.
*B62B 3/04* (2006.01)
(52) U.S. Cl. .......................... 280/656; 280/10; 280/20; 280/47.34
(58) Field of Classification Search ............... 280/7.1, 280/7.17, 33.998, 656, 47.34, 79.11, 79.4, 280/8, 9, 10, 18, 18.1, 19, 28.17, 35, 30
See application file for complete search history.

(56) References Cited

U.S. PATENT DOCUMENTS

| | | | | |
|---|---|---|---|---|
| 2,628,847 | A * | 2/1953 | Hawkins | 280/47.34 |
| 3,693,993 | A | 9/1972 | Mazzarelli et al. | 280/30 |
| 4,902,027 | A * | 2/1990 | Skelly | 280/33.998 |
| 5,318,312 | A * | 6/1994 | Montemayor | 280/30 |
| 5,362,079 | A | 11/1994 | Graham | 280/47.23 |
| 5,536,027 | A * | 7/1996 | Gollub | 280/30 |
| 5,553,875 | A * | 9/1996 | Ulicne et al. | 280/20 |
| 5,941,665 | A * | 8/1999 | Dahlin | 410/20 |
| 7,156,403 | B2 * | 1/2007 | Abbott | 280/79.11 |
| 2007/0296167 | A1 * | 12/2007 | Beswick et al. | 280/47.34 |

* cited by examiner

*Primary Examiner*—Lesley Morris
*Assistant Examiner*—John D Walters
(74) *Attorney, Agent, or Firm*—LaMorte & Associates

(57) ABSTRACT

An assembly and method for adapting a baby stroller to better travel over unstable ground, such as sand. A sledge is provided that has a top surface and a bottom surface. The bottom surface is flat with a beveled front end that enables the sledge to be easily pulled over sand or mud. Retention features, such as semi-cylindrical depressions, are formed in the top surface of the sledge. The retention features enable a baby stroller to be placed atop the sledge without rolling off. Once the wheels of the stroller are attached to the sledge, the sledge can be pulled through sand and mud more easily. The sledge may be supported by wide wheels to help the sledge roll over unstable ground. Furthermore, the sledge may be collapsible so that it can be easily stored when not in use.

11 Claims, 3 Drawing Sheets

ASSEMBLY FOR TOWING A WHEELED STROLLER ON SAND

BACKGROUND OF THE INVENTION

1. Field of the Invention

The present invention relates to devices adapted to receive and carry wheeled carts along the sand on a beach. More particularly, the present invention relates to portable devices specifically designed to support baby strollers upon sand or other loose earth.

2. Prior Art Statement

When people travel to the beach, a lake, or other recreational location, they often take a large number of accessories intended to make the visit more pleasurable. For example, when people visit the beach, they often take folding chairs, umbrellas, coolers, buckets, shovels, blankets, fishing poles and bags filled with smaller items such as sunscreen and a change of clothing. In many instances, a person visiting the beach is unable to drive his/her vehicle directly onto the beach. Similarly, many people visiting the beach stay at hotels or homes that are not directly on the beach. As a consequence, people traveling to the beach are required to physically carry to the beach all the accessories they require. Often the number of accessories is too great for a single trip, so a person must make multiple trips to and from the beach in order to transport all the needed accessories. This problem is compounded for people who have small children. Small children require many extra accessories such as playpens, toys, diaper bags and swimming safety gear, all of which must also be carried to and from the beach. Furthermore, small children cannot be left on a beach unattended. Consequently, an adult working alone must carry the child with them each time they walk on and off the beach.

Transporting a small child back and forth would be greatly simplified if a baby stroller could be used. A baby stroller would hold the child and much of the equipment needed for the child. The only problem is that strollers do not roll on sand, mud, or loose gravel. Most baby strollers are designed with small narrow wheels. This enables the stroller to roll rapidly and turn quickly on hard, smooth surfaces. However, when a traditional stroller is pushed onto a beach or onto loose gravel, the narrow wheels quickly sink into the ground. The stroller must then be either carried or pulled through the sand as the wheels plow troughs along the beach.

In the prior art, there have been many devices developed over the years that are specifically intended to alleviate the burden of carrying a large number of accessories to and from the beach. One prior art approach has been to provide a wheeled vehicle, like a wheelbarrow, that can be loaded with gear and pushed or pulled to the beach. Such prior art devices are exemplified by U.S. Pat. No. 3,693,993 to Mazzarelli et al., entitled Beach Tote Cart and U.S. Pat. No. 5,362,079 to Graham, entitled Beach Caddy. Some of the problems associated with such prior art devices are that such devices are expensive, bulky and labor intensive to manufacture. Often people traveling to the beach or another recreational location have packed their vehicles to capacity and have no extra room for a large bulky wheeled cart.

A second problem associated with such beach carts is they are designed to hold bulk items. The beach carts themselves are not designed to hold small children safely. Consequently, using a beach cart does not eliminate the need to use a stroller.

A need therefore exists for a device that can be attached to a traditional stroller so that the stroller can be readily pulled across sand or loose gravel. In this manner, a baby and much of the baby's gear can be taken to the beach using the stroller, thereby greatly reducing the difficulty of taking a small child to the beach. This need is met by the present invention as described and claimed below.

SUMMARY OF THE INVENTION

The present invention is an assembly and method for adapting a baby stroller to better travel over unstable ground, such as sand.

A sledge is provided that has a top surface and a bottom surface. The bottom surface is flat with a beveled front end that enables the sledge to be easily pulled over sand or mud. Retention features, such as semi-cylindrical depressions, are formed in the top surface of the sledge. The retention features enable a baby stroller to be placed atop the sledge without rolling off.

Once the wheels of the stroller are attached to the sledge, the sledge can be pulled through sand and mud much more easily.

The sledge may be supported by wide wheels to help the sledge roll over unstable ground. Furthermore, the sledge may be collapsible so that it can be easily stored when not in use.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention assembly can be configured to hold many items on a beach, such as a wheeled cooler, it is especially well suited for holding a baby stroller. Accordingly, by way of example, the present invention assembly is shown illustrated and described in conjunction with a baby stroller. This exemplary embodiment was selected in order to present one of the best modes contemplated for the invention. The selected exemplary embodiment, however, should not be considered a limitation upon the wording of the claims.

Figure 1:
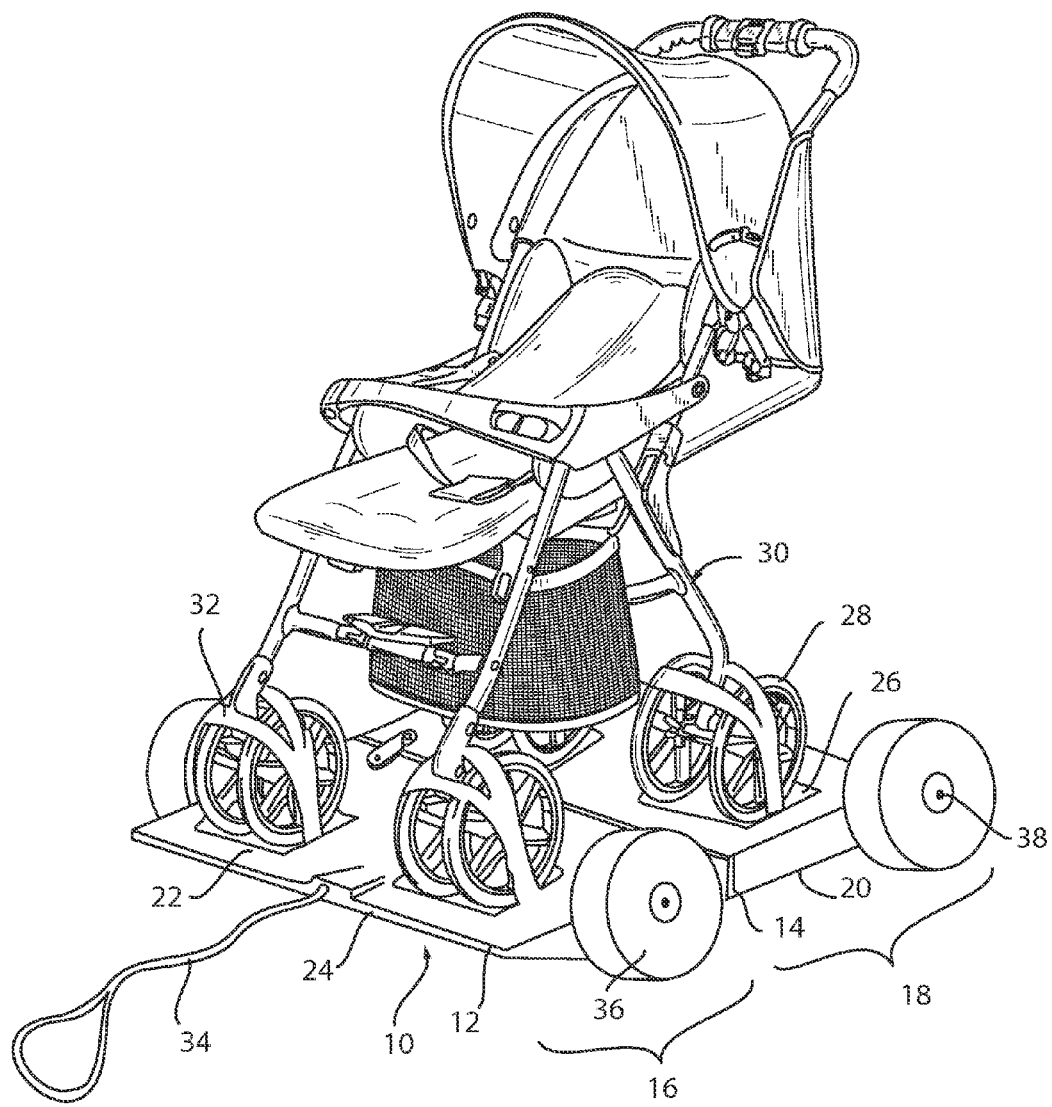
FIG. 1 is a perspective view of an exemplary embodiment of a sledge assembly shown in conjunction with a baby stroller.
Figure 2:
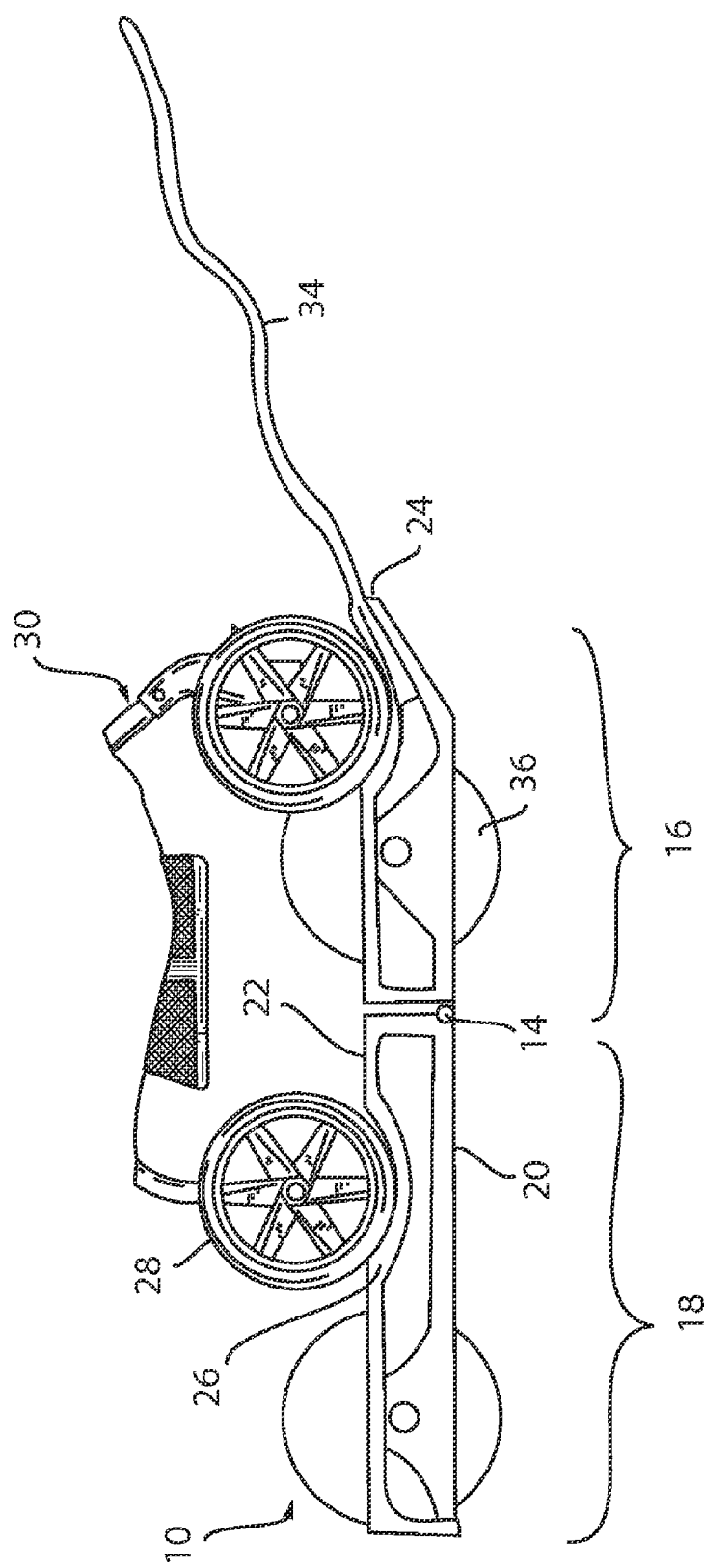
FIG. 2 is a side view of the exemplary embodiment of FIG. 1.

Referring to FIG. 1 in conjunction with FIG. 2, a foldable assembly 10 is shown. The assembly 10 has a sledge body 12 that is divided at a hinged joint 14. The hinged joint 14 divides the sledge body 12 between a forward section 16 and a rearward section 18. The hinged joint 14 enables the forward section 16 and the rearward section 18 of the sledge body 12 to be selectively folded between an open configuration and a folded configuration. In the embodiment of FIG. 1 and FIG. 2, the sledge body 12 is shown in an open configuration where the forward section 16 and the rearward section 18 are aligned in a common plane on either side of the hinge joint 14.

When the forward and rearward sections 16, 18 of the sledge body 12 are in their open configuration, the sledge body 12 is provided with a bottom surface 20 and a top surface 22. The bottom surface 20 of the sledge body 12 is generally flat except for a tapered forward edge 24. The top surface 22 of the sledge body 12 is not flat. Rather, four large depressions 26 are formed into the top surface 22. The four depressions 26 are preferably semi-cylindrical in shape so that they can receive and retain the wheel sets 28 of a stroller 30.

Straps, clamps or other such mechanical fasteners 32 are affixed to the top surface of the main body, adjacent the four depressions 26. It can be seen that the four depressions 26 are spaced to receive the four wheel sets 28 of a baby stroller 30. The mechanical fasteners 32 are used to engage the wheel sets of the baby stroller 30 to insure that the stroller 30 does not inadvertently detach from the sledge body 12 of the assembly 10.

A handle 34 is provided. The handle 34 can be flexible, such as a piece of strapping, or rigid, such as a telescoping pole. In the shown embodiment, a flexible handle is provided. The handle 34 is preferably storable within the sledge body 12 when the assembly 10 is moved into its folded configuration.

Four wheels 36 are provided. The four wheels 36 are attached to the sledge body 12 with axles 38. The wheels 36 are wide and light weight. The wheels 36 can be pneumatic, but are preferably molded plastic so as to be low cost.

As can be seen from FIG. 2, the wheels 36 only extend a short distance below the bottom surface 20 of the sledge body 12. This provides the bottom surface 20 of the sledge body 12 with ground clearance of between one inch and three inches. With such short ground clearance, it will be understood that if the wheels 36 sink into soft sand, the bottom surface 20 of the sledge body 12 would soon come to rest atop the sand. The sledge body 12 would then act as a sled and would enable the entire assembly 10 to be pulled over the sand with little resistance from the wheels 36.

Figure 3:
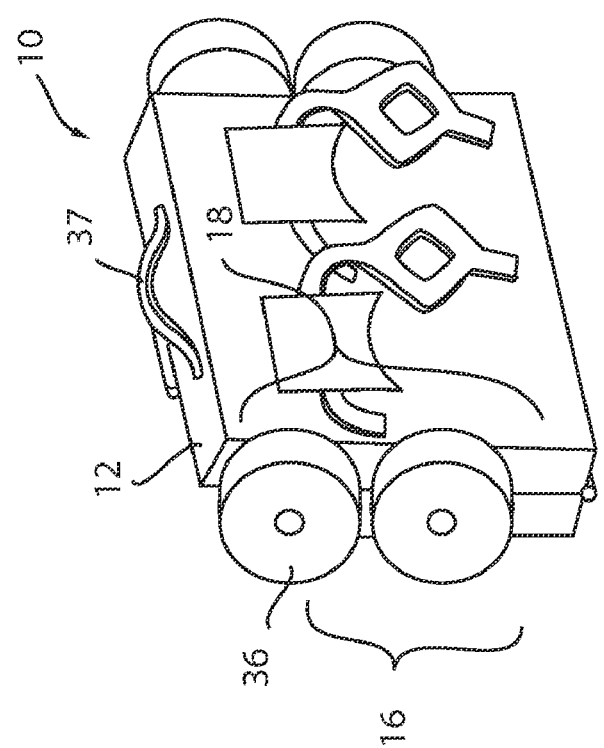
FIG. 3 is a perspective view of the sledge assembly shown in a folded configuration.

Referring to FIG. 3, it can be seen that the sledge body 12 of the assembly 10 can be manipulated into a folded configuration. When in the folded configuration, the bottom surface 20 of both the forward section 16 and the rearward section 18 of the sledge body 12 fold against each other. It can be seen that the wheels 36 are attached to the sledge body 12 at positions that prevent the wheels 36 from interfering with one another when in the folded configuration. It will therefore be understood that when the sledge body 12 is closed into its folded configuration, the wheels 36 are the thickest part of the assembly 10. This enables the assembly 10 to be easily stored when not in use. A secondary handle 37 can be provided to carry the assembly 10 in its folded condition.

Referring collectively to FIG. 1, FIG. 2 and FIG. 3, it will be understood that to use the present invention assembly 10, it is first opened from its folded configuration (FIG. 3) into its open configuration (FIG. 1). Once opened, an open stroller 30 is placed upon the top surface 22 of the sledge body 12. The wheel sets 28 of the baby stroller 30 are received by the semi-cylindrical depressions 26. The mechanical fasteners 32 are then used to bind the wheel sets 28 of the baby stroller 30 in place.

With the baby stroller 30 firmly attached to the top surface 22 of the sledge body 12, both the baby stroller 30 and the overall assembly 10 can be manipulated together by pushing and/or pulling upon the handles of the baby stroller 30. However, if the assembly 10 is heavily loaded and is traveling through fine sand, a person can decide to directly pull the assembly directly by grabbing the handle 34.

Once the assembly 10 is used to pull the baby stroller through sand, mud or other loose soil, the mechanical fasteners 32 can be detached. The stroller 30 is then free to be rolled off the sledge body 12. The assembly 10 is then folded and stored until next needed.

It will be understood that the embodiment of the assembly that is shown is merely exemplary and that a person skilled in the art can make many variations to that embodiment. For instance, the length and width of the sledge body can be changed to match the dimensions of different stroller types. The size of the wheels and the number of wheels can be altered. Likewise, the length and composition of the pull handle can be changed as a matter of design choice. All such variations, modifications, and alternate embodiments are intended to be included within the scope of the present invention as defined by the claims.

What is claimed is:

1. A method of adapting a baby stroller with wheels to better travel over unstable ground, said method comprising the steps of:

providing a sledge having a top surface, a flat bottom surface, a forward end and sides, wherein a hinged joint extends between said sides of said sledge along said flat bottom surface, therein dividing said flat bottom surface into two sections capable of rotating about said hinged joint;

providing depressions on said top surface of said sledge and retention straps for holding said wheels of said baby stroller within said depressions;

placing said baby stroller on said top surface of said sledge, wherein said wheels of said baby stroller are received by said depressions;

mechanically interlocking said wheels of said baby stroller with said retention straps, thereby preventing said wheels from inadvertently separating from said sledge; and pulling said sledge over said unstable ground.

2. The method according to claim 1, wherein forward end of said sledge is beveled.

3. The method according to claim 2, further including the step of attaching wheels to said sides of said sledge that help support said sledge on said unstable ground.

4. The method according to claim 3, further including the step of providing a pull handle to said sledge, wherein said step of pulling said sledge over said unstable ground is accomplished by pulling said pull handle.

5. The method according to claim 1, wherein said sledge is selectively foldable about said hinged joint between an open configuration and a folded configuration.

6. An assembly comprising:

a baby stroller having four wheel sets;

a sledge having a bottom surface and a top surface, wherein said sledge contains a forward section and a separate rearward section that are joined together by a hinged joint along said flat bottom surface, therein enabling said forward section and said rearward section to rotate about said hinged joint;

depressions disposed on said top surface at positions that receive said wheel sets of said baby stroller, when said baby stroller is placed upon said top surface; and fastening straps for binding said wheel sets on said baby stroller in said depressions.

7. The assembly according to claim 6, further including a plurality of wheels that support said sledge.

8. The assembly according to claim 6, further including a handle for pulling said sledge.

9. The assembly according to claim 6, wherein said sledge has a front end and a rear end.

10. A sledge assembly for pulling a wheeled object over loose ground, said assembly comprising:

a sledge body having a forward section and a rearward section joined together at a hinged joint that enables said sledge body to be selectively configured between an open configuration and a folded configuration, wherein both said forward section and said rearward section have a top surface and a bottom surface, wherein said hinged joint joins said bottom surface of said forward section to said bottom surface of said rearward section, therein enabling said bottom surface of said forward section and said rearward section to abut in a coplanar alignment when said sledge body is in said open configuration;

a plurality of semi-cylindrical depressions formed in said top surface of said forward section and said top surface of said rearward section;

at least one retention strap associated with each of said depressions for strapping an object into each of said depressions; and a handle extending from said forward section.

11. The assembly according to claim 10, further including a plurality of wheels that support said sledge body when said sledge body is in said open configuration.

\* \* \* \* \*